United States Patent [19]

Shiozaki et al.

[11] 4,416,232

[45] Nov. 22, 1983

[54] ELECTRICAL FUEL INJECTION PUMP GOVERNOR

[75] Inventors: Makoto Shiozaki; Satoshi Haseda; Jun Tarui, all of Kariya; Osamu Ito, Toyota; Nobuhito Hobo, Inuyama; Yoshihiko Tsuzuki, Toyota; Shizuo Kawai, Kariya; Hiroshi Sami, Numazu, all of Japan

[73] Assignee: Nippondenso Co., Ltd., Kariya, Japan

[21] Appl. No.: 282,955

[22] Filed: Jul. 13, 1981

[30] Foreign Application Priority Data

Jul. 14, 1980 [JP] Japan ................... 55-96631

[51] Int. Cl.³ .............................................. F02D 1/04
[52] U.S. Cl. ................................... 123/357; 123/361
[58] Field of Search .................... 123/361, 357, 358

[56] References Cited

U.S. PATENT DOCUMENTS

| | | | |
|---|---|---|---|
| 3,407,793 | 10/1968 | Lang | 123/358 |
| 3,795,826 | 3/1974 | Adey | 123/357 |
| 3,867,918 | 2/1975 | Williams | 123/358 |
| 3,903,852 | 9/1975 | Sola | 123/357 |
| 3,973,538 | 8/1976 | Williams | 123/357 |
| 4,223,654 | 9/1980 | Wessel | 123/358 |
| 4,243,004 | 1/1981 | Ritter | 123/358 |
| 4,318,378 | 3/1982 | Eheim | 123/357 |
| 4,357,920 | 11/1982 | Stumpp | 123/358 |

*Primary Examiner*—Ronald B. Cox
*Attorney, Agent, or Firm*—Cushman, Darby & Cushman

[57] ABSTRACT

An electrical governor for a fuel injection pump with a spill ring comprises an acceleration pedal operating amount (PA) detector, an engine rotational speed (N) detector, a spill ring displacement detector, a maximum limit injection amount pattern memory for storing the relation between the engine rotational speed (N) and the maximum smoke concentration generating injection amount (Qmax), a partial load injection amount pattern memory for storing the relation between the rotational speed (N) and the partial load injection amount (Qpar) corresponding to the acceleration pedal operating amount (PA) with the acceleration pedal operating amount (PA) as a parameter, a minimum limit injection amount pattern memory for storing the relation between the rotational speed (N) and the minimum limit injection amount (Qmin), a target position pattern memory for storing the relation between the target injection amount (Qf) and the spill ring displacement target position ($V_{SN}$), microcomputer means for reading out the values Qmin, Qpar and Qmax for the detected values PA and N and calculating the values Qf and $V_{SN}'$ corresponding to the detected values PA and N by interpolation, and actuator drive means for correcting the spill ring displacement in accordance with the calculated target position $V_{SN}'$, thereby correcting the change in the fuel injection amount caused by the change in rotational speed. The governor alternatively includes a target position pattern memory for storing the relation between the values PA, N and $V_{SN}$ for a corresponding value Qf.

7 Claims, 30 Drawing Figures

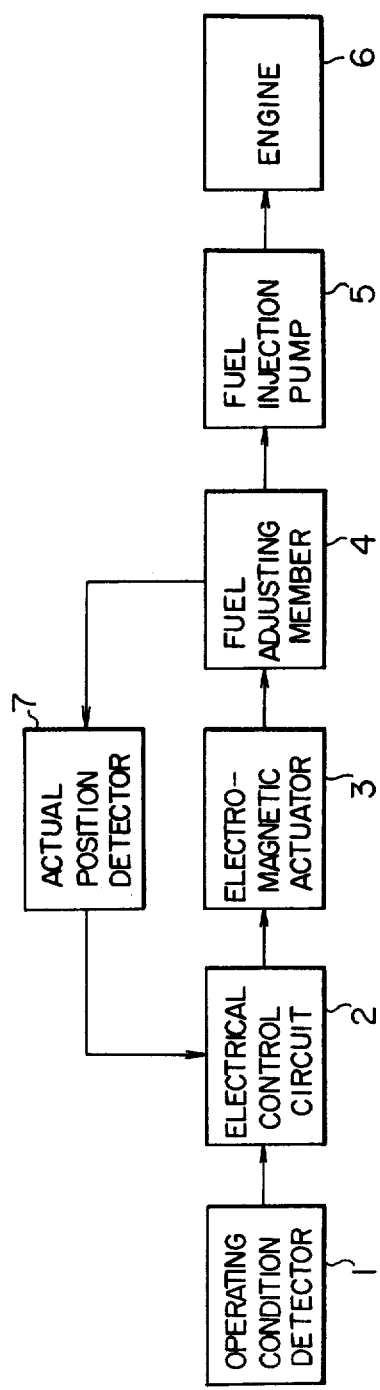
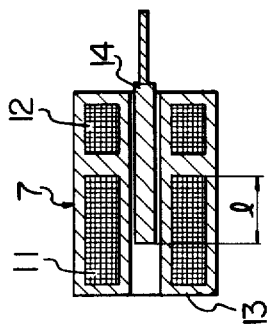
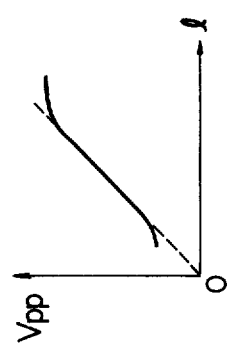
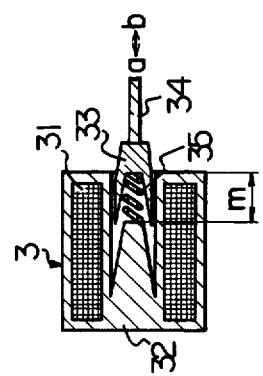
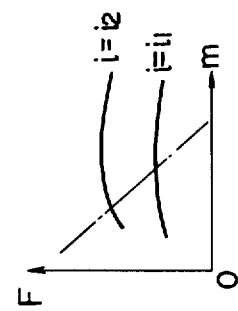

ELECTRICAL FUEL INJECTION PUMP GOVERNOR

BACKGROUND OF THE INVENTION

The present invention relates to an electric fuel injection pump governor for a fuel injection pump of an internal combustion engine of compressed ignition type (Diesel engine), in which a value corresponding to a target of the amount of fuel injection is calculated by searching a predetermined memory map thereby to correct the actual amount of injection to the target.

In conventional methods of controlling the amount of fuel injection of the distribution type fuel injection pump of the Diesel engine, the centrifugal force generated by the flyweight driven by the governor drive gear provides a basis with which a variety of spring levers are combined in a complicated manner thereby to generate a fuel injection amount pattern (what is called the governor pattern). This is what is called a mechanical governor. The governor patterns generated by the mechanical governor are basically of two types, the all speed type governor pattern and the minimum-maximum speed type governor pattern. The all-speed type governor pattern has the advantage that the control may be effected to maintain a fixed rotational speed at any given engine speed depending on the characteristics thereof. In the case where this type of governor pattern is used for the automobile engine, however, the driver feels that the acceleration characteristic of the automobile is deteriorated. On the other hand, the shortcoming of the minimum-maximum speed type governor pattern is that in spite of the satisfactory acceleration characteristic felt by the driver, it is difficult for the engine rotation speed to be maintained constant against load changes.

In view of these facts, the all-speed type governor pattern superior in the stability of the engine rotational speed is suitable in the low speed range, namely, in or about the idling speed, while the minimum-maximum speed type governor superior in acceleration characteristic is a choice for the engine being accelerated or under a load. It is therefore desirable to change the governor pattern according to the engine rotation speeds, and in order to achieve this, the governor pattern is generated by use of various springs and levers in usual arrangements. The mechanical governor, which uses various types of springs and levers, is large in weight, low in accuracy and too complicated to receive satisfactory maintenance. In addition, if the error of the amount of injection encountered by the distribution type of the fuel injection pump at the same spill ring position depending on the engine rotational speed is to be corrected, a more complicated device is required, resulting in an increased volume, weight and cost.

SUMMARY OF THE INVENTION

The present invention has been developed in order to obviate these disadvantages of the conventional mechanical governors and an object thereof is to provide an electric fuel injection pump governor simple in construction, high in control accuracy, superior in workability and high in stability in an idle run, in which a value corresponding to a target amount of injection for a fuel injection pump having a spill ring is calculated by searching a predetermined memory map and the actual amount of injection is corrected to the target amount of injection.

Another object of the present invention is to provide an electric fuel injection pump governor in which a predetermined memory map containing the target amount of injection and the engine rotational speed as parameters in searched and the target position of the fuel regulation member is calculated thereby to correct the error of the injection amount occurring due to the rotational speed at the same position of the fuel regulation member.

Generally, in a mechanical governor, the amount of fuel injection is increased at a fixed rate substantially in proportion to the degree of operation of the acceleration pedal. In this case, the driver does not feel a good acceleration characteristic. According to the present invention, the rate of fuel increase with the change in the degree of accelerator pedal operation is increased at the initial stage of acceleration pedal depression, while the rate of fuel increase with the change in pedal depression is reduced at the end of the depression in order to improve the acceleration characteristics of the automobile.

BRIEF DESCRIPTION OF THE DRAWINGS

FIG. 1 is a diagram showing a general construction of a first embodiment of the present invention.

FIG. 2 is a sectional view showing the essential parts of an actual position detector included in FIG. 1.

FIG. 3 shows a characteristic diagram of the actual position detector.

FIG. 4 is a sectional view of the essential parts of the electromagnetic actuator in FIG. 1.

FIG. 5 shows a characteristic diagram of the electromagnetic actuator.

DESCRIPTION OF THE PREFERRED EMBODIMENTS

Figure 6:
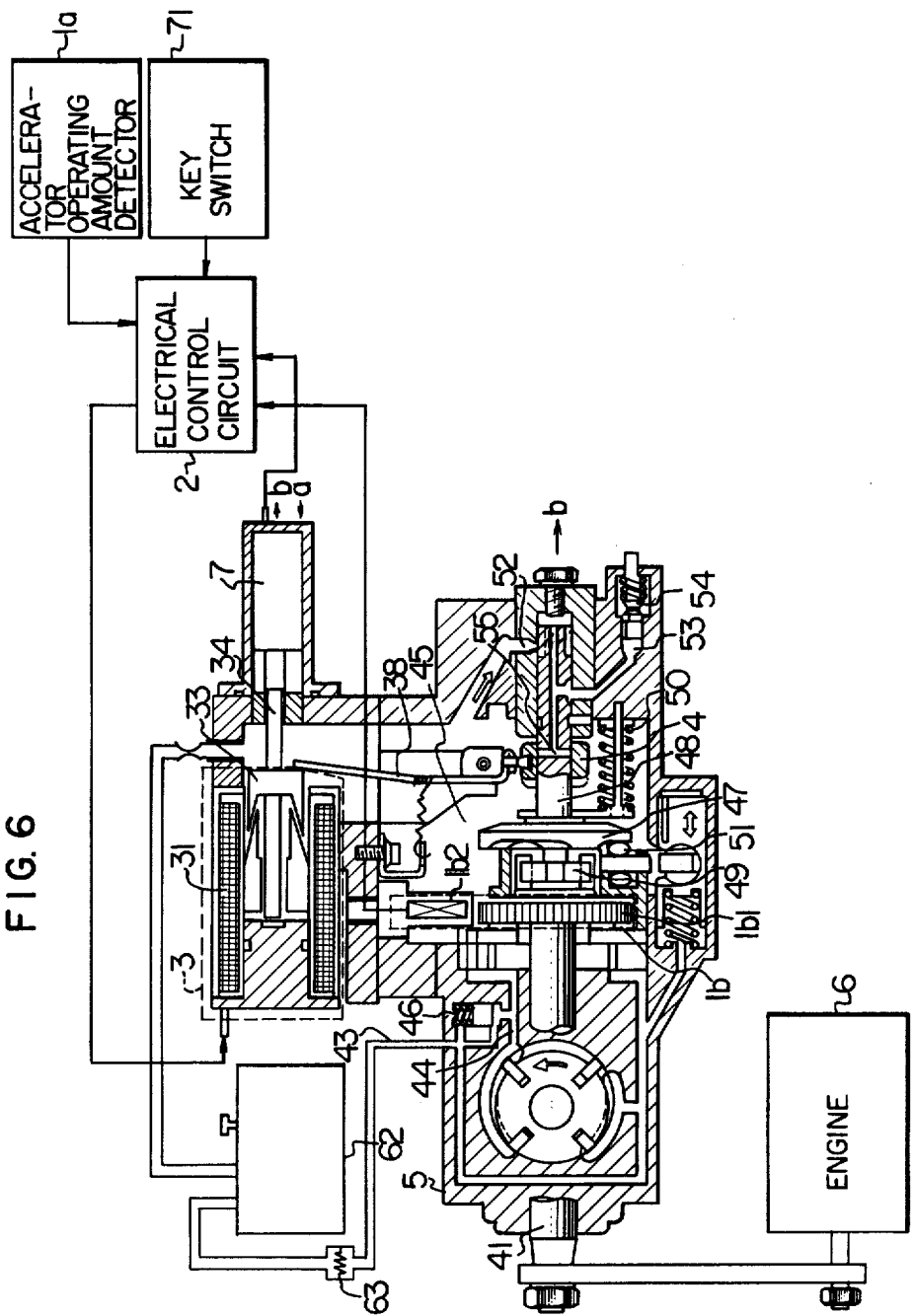
FIG. 6 is a longitudinal sectional view of the essential parts of an application of the present invention to a Bosch distribution type fuel injection pump with the vane pump shown in a cross sectional view.

The arrangement of an embodiment of the present invention is shown in FIG. 1. Reference numeral 1 designates an operating condition detector for detecting the operating conditions of an engine 6 (which is a Diesel engine in this embodiment) as an electrical signal, and comprises an acceleration pedal operation amount detector 1a and an engine rotational speed detector 1b shown in FIG. 7. Numeral 2 designates an electrical control circuit including target value calculator means and drive means for calculating the target position of a fuel adjusting member (spill ring) 4 corresponding to a target amount of fuel injection into the engine 6 in response to an accelerator pedal operation amount signal and the rotational speed signal from the operating condition detector 1 on the one hand and for driving an electromagnetic actuator 3 to correct the error between the actual amount of fuel injection and the target amount of fuel injection in response to a signal representing the target position of the spill ring and the actual position signal corresponding to the actual amount of fuel injection detected by the actual position detector 7 on the other hand. The electromagnetic actuator 3 is adapted to drive the fuel adjusting member 4 in response to the signal from the electrical control circuit 2. The fuel adjusting member 4 represents a spill ring, and the fuel injection pump 5 is representative of a Bosch distribution type fuel injection pump. The actual position detector 7 is for detecting the position of the fuel adjusting member (spill ring) 4 for adjusting the amount of fuel to be injected actually into the engine from the fuel injection pump 5, and uses in this embodiment a position sensor of variable inductance type.

The construction of the actual position detector 7 of variable inductance type is shown in FIG. 2. A primary winding 12 and a secondary winding 11 are wound on a hollow bobbin 13. A core 14 is inserted into the hollow part of the bobbin 13. Upon application of an exciting signal of a fixed amplitude and a fixed frequency to the primary winding 12, a voltage is generated across a terminal resistor, if any, of the secondary winding 11. Assume that the core 14 inserted into the hollow part of the bobbin 13 is overlaid on the secondary winding 11 over the length of l. The relation between the voltage Vpp generated across the secondary winding 11 and the length l is as shown in FIG. 3. The actual position detector of the embodiment under consideration utilizes the linear part of this characteristic curve.

The construction of the electromagnetic actuator 3 is shown in FIG. 4. The electromagnetic actuator 3 includes a coil 31, a core 32 for holding the coil 31 and making up a magnetic circuit, a moving core 33, a connecting rod 34 directly coupled to the moving core 33, and a spring 35. The moving core 33 and the connecting rod 34 are movable in both directions of a and b. The moving core 33 stops under the condition where the force in the direction of arrow a generated by the current flowing in the coil 31 is balanced with the power of restitution in the direction of arrow b generated by the spring 35 mounted within the electromagnetic actuator 3. The relation between the current flowing in the coil 31, the length m of the gap between the core 32 and the moving core 33, and the force F generated in the direction of arrow a by the current is shown in FIG. 5. The one-dot chain in FIG. 5 indicates the force in the direction of arrow b generated by the spring 35. As seen from this drawing, the position of the fuel adjusting member in this embodiment may be controlled by controlling the current flowing in the coil 31.

The diagram of FIG. 6 is a sectional view of the essential parts of the Bosch distribution type fuel injection pump to which the apparatus according to the present invention is applied. Numeral 6 designates a 4-cycle Diesel engine, numeral 5 a fuel injection pump, and numeral 41 a pump drive shaft which in the case of a 4-cycle engine uses a vane pump driven at a rotational speed one half of the rotational speed of the crank shaft, and takes in the fuel by way of the inlet 43 through the fuel filter 63 from the fuel tank 62 while discharging the fuel through the outlet 44. The fuel that has left the outlet 44 is filled up in a fuel reservoir 45 in a pump housing, adjusted in pressure by a fuel pressure regulator 46, and any extraneous fuel is returned to the fuel tank 62. The face cam 47 is integrated with a pump plunger 48, which are coupled to each other by a pump drive shaft 41 and a coupling 49 for transmission of the turning effort. This face cam 47 is pressed against a roller 51 by the plunger spring 50, and therefore with the rotation of the pump drive shaft 41, the plunger 48 performs both reciprocating and rotational motions so that the fuel taken in by way of the inlet 52 is distributed under pressure. The fuel distribution under pressure is started when the plunger 48 moves in the direction of arrow b and the inlet 52 is closed. Thus the fuel is passed through a distribution path 53, a delivery valve 54 and a high pressure distribution pipe and injected from a fuel injection nozzle into each cylinder of the engine. The fuel distribution under pressure ends when the plunger 48 moves in the direction of arrow b so that the spill port 55 is opened to the fuel reservoir 45 from the right end (toward the direction b) of the spill ring making up the fuel adjusting member. Thus, by moving the spill ring 4 along the axis of the plunger 48, the amount of fuel injection can be adjusted.

The electromagnetic actuator 3 determines the position of the moving core 33 by the balance between the force in the direction of arrow a generated by the current in the coil 31 and the force in the direction of arrow b generated by the spring 35. The moving core 33 displaces the spill ring 4 through the connecting rod 34 and the link mechanism 38 thereby to regulate the amount of fuel injection. Numeral 1b designates a rotational speed detector for detecting the rotational speed of the engine, by which the rotational speed of the gear 1b1 directly coupled to the pump drive shaft 41 is detected by the electromagnetic pickup 1b2 and the resulting electrical signal is applied as a rotational speed signal to the electrical control circuit 2. Numeral 1a designates an acceleration pedal operating amount detector using, say, a potentiometer, whereby an electrical signal corresponding to the amount of operation of the acceleration pedal is applied to the electrical control circuit 2. Numeral 71 designates a key switch for detecting the on and off of the battery voltage and the starter.

The electrical control circuit 2 calculates the target position of the spill ring 4 associated with the target amount of injection of the fuel injection pump in response to the detection signals from the engine rotational speed detector 1b, the acceleration pedal operating amount detector 1a and the key switch 71, compares the signal representative of the target position with the actual position signal from the actual position detector 7, and applies a signal to the electromagnetic actuator 3 on the basis of the error signal from the comparator means thereby to actuate the electromagnetic actuator 3 in a manner to correct the error. In this embodiment, the calculations of the target amount of fuel injection and the target position are executed by computer.

Figure 7:
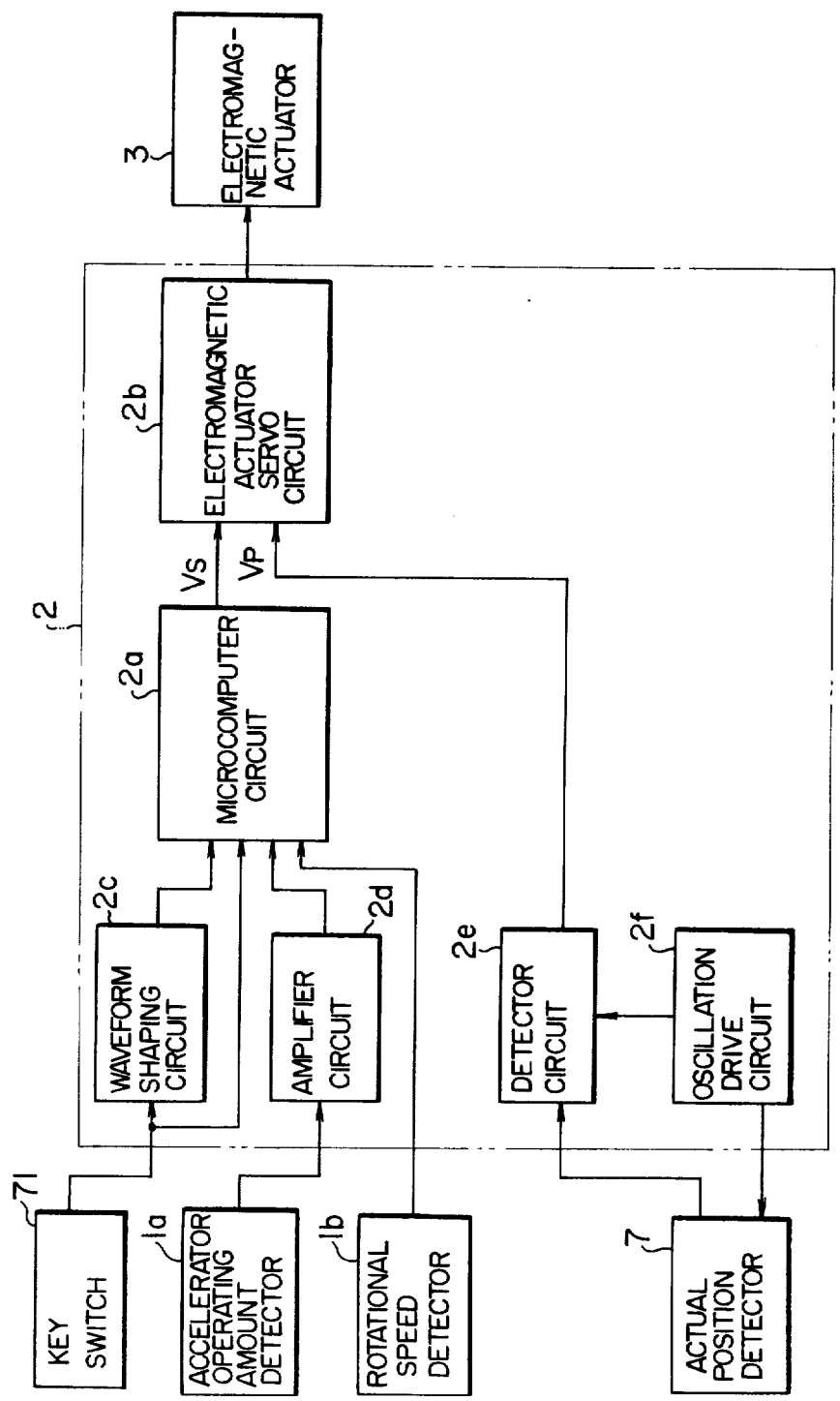
FIG. 7 is a block diagram showing an electrical control circuit in FIG. 1.

The construction of the electrical control circuit 2 is shown in FIG. 7. The electrical control circuit 2 includes a microcomputer section 2a for calculating the target position of the spill ring and the target amount of fuel injection on the basis of the signals from the detectors, an electromagnetic actuator servo circuit 2b which, in response to the actual position signal from the actual position detector 7 and the target position signal representative of a target position of the spill ring calculated by the microcomputer section 2a, drives the electromagnetic actuator 3 in a manner to correct the error between the two inputs thereof, a waveform shaping circuit 2c, an amplifier circuit 2d, a detector circuit 2e and an oscillation drive circuit 2f.

Figure 8:
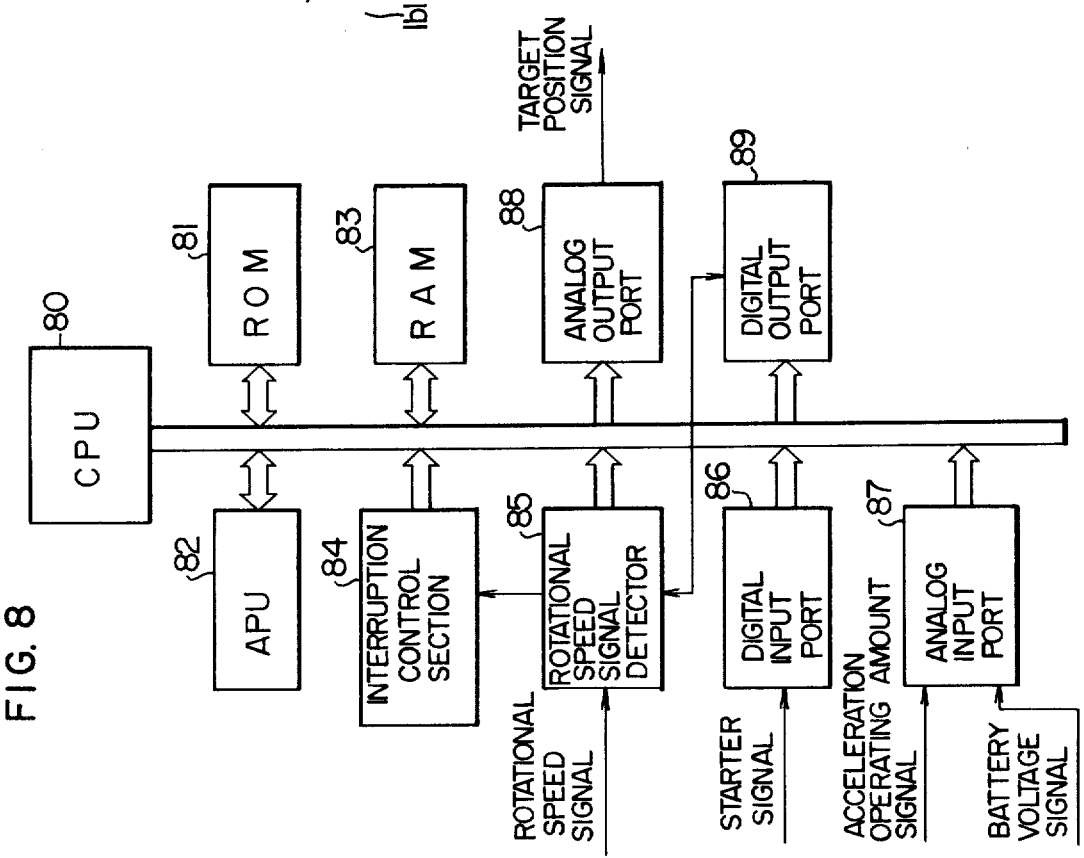
FIG. 8 is a block diagram showing a microcomputer in FIG. 7.

A detailed construction of the microcomputer section 2a is shown in FIG. 8. Numeral 80 designates a central processing unit (CPU) for calculating the target amount of fuel injection, which uses an 8-bit construction. Numeral 81 designates a read only memory (ROM) for storing a control program and control parameters, numeral 82 is a numeral calculation unit for executing a multiplication and a division in a hardware fashion, numeral 83 is a random access memory (RAM) used for temporary storage of the control data. Numeral 84 is an interruption control section for controlling the interruption in the central processing unit 80, which informs the central processing unit of an interruption. An example of interruption in this embodiment is the one by the rotational speed pulse generated from the output of the rotational speed detector 1b. Numeral 85 designates a rotational speed signal detector section having such a function that the width of the waveform-shaped pulse signal generated from the rotational speed detector 1b is counted by a clock signal generated from the central processing unit 80 thereby to apply a value inversely proportional to the engine rotational speed to the central processing unit 80. The digital input port 86 is one used for input of a logical signal and is supplied with a waveform shaped signal from the key switch 71 in order to recognize that the starter is driven at the time of engine start. The analog input port 87 is used for input of an analog signal and converts an acceleration pedal operating amount signal and a battery voltage signal into a digital signal. Numeral 88 designates a section for converting the target position signal calculated by the central processing unit 80 into an analog voltage. Numeral 89 is a circuit for producing externally a switch signal from the central processing unit 80, and through this circuit 89, the central processing unit 80 resets the flip-flop and the counter within the rotational speed signal detector section 85.

Figure 9:
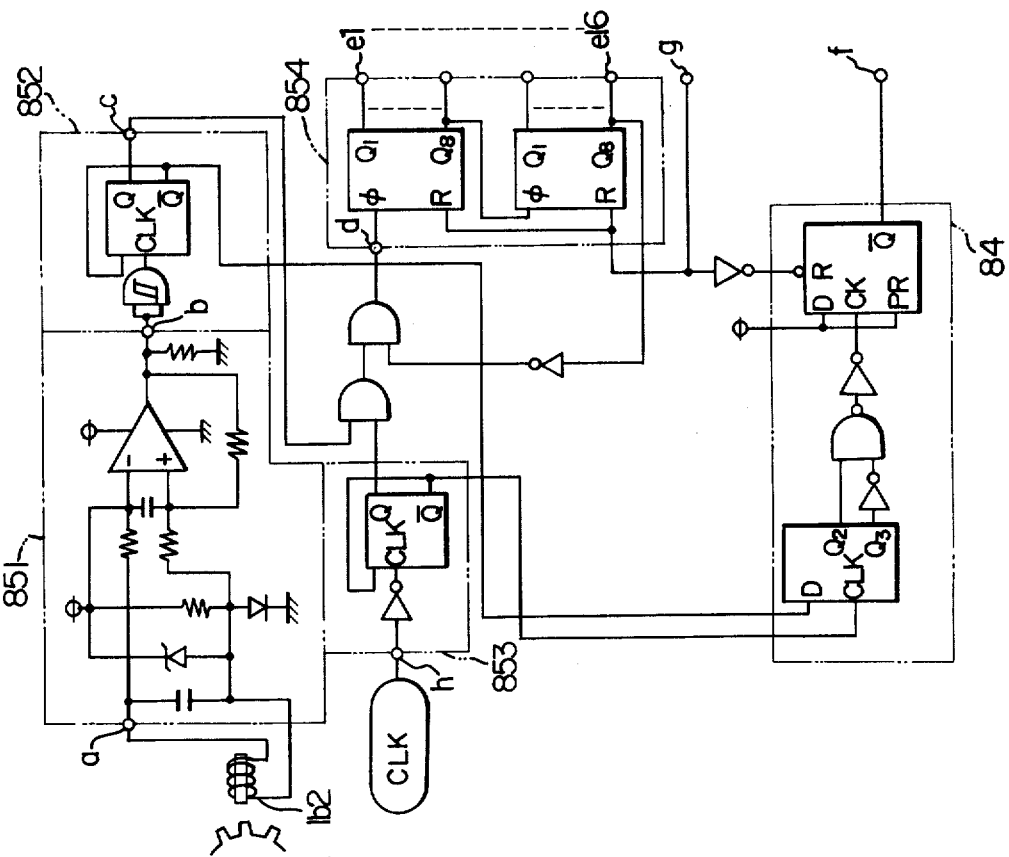
FIG. 9 shows an electrical circuit for an interruption control section and a rotational speed signal detector section in FIG. 8.
Figure 10:
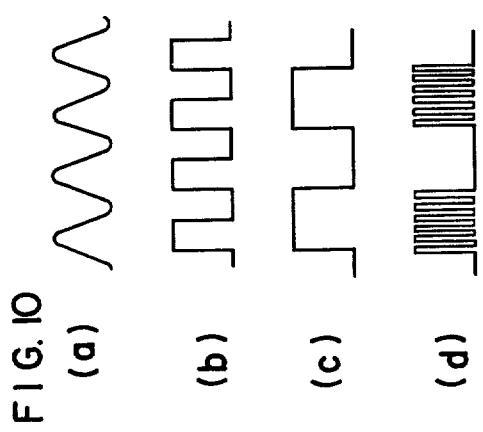
FIGS. 10a–10d show signal waveforms generated at various parts of the circuit of FIG. 9.

A detailed arrangement of the rotational speed signal detector section 85 and the interruption control section 84 is shown in FIG. 9. Signal waveforms generated at various parts in FIG. 9 are shown in FIG. 10. Numeral 1b1 designates a gear directly coupled to the pump drive shaft 41 of the distribution type fuel injection pump, and numeral 1b2 is an electromagnetic pickup for detecting the roughness of the teeth of the gear 1b1, the output waveform at the terminal a being shown in FIG. 10(a). Numeral 851 designates a circuit for waveform shaping the signal generated by the electromagnetic pickup and for producing at the terminal b a pulse signal easily handled by the digital circuit as shown in FIG. 10(b). Numeral 852 shows a frequency dividing circuit for dividing into a half the output signal at the terminal b as shown in FIG. 10(c). Numeral 853 shows a frequency-dividing circuit and an inverter for inverting the polarity of the pulse signal applied to the terminal h. Numeral 854 shows a counter section for counting the number of pulses of the signal applied from the terminal d and shown in FIG. 10(d), the counter section 854 producing 16 bits from e1 to e16. In response to the signal at the terminal c of the interruption control section 84 and the pulse signal from the frequency dividing circuit 853, the interruption control section 84 produces an interruption signal for the central processing unit 80 at the terminal f. The terminal g is supplied with a flip-flop reset signal.

Figure 11:
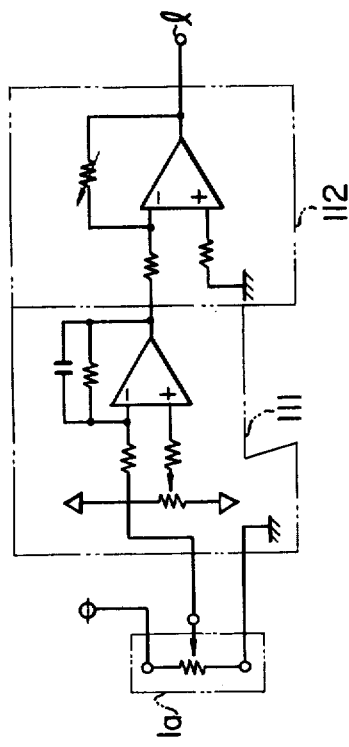
FIG. 11 shows an electrical circuit for the amplifier circuit shown in FIG. 7.

The diagram of FIG. 11 shows an amplifier circuit 2d for amplifying the signal from the acceleration pedal operating amount detector 1a into a form easily handled by the microcomputer section 2a. Numeral 111 designates a circuit for vertically moving the signal level from the detector 1a, and numeral 112 designates an amplifier section for setting the circuit gain freely. This amplifier circuit is capable of determing as desired a signal voltage corresponding to the amount of the acceleration pedal operation. The output signal at the terminal 1 is applied to the analog input port 87.

Figure 12:
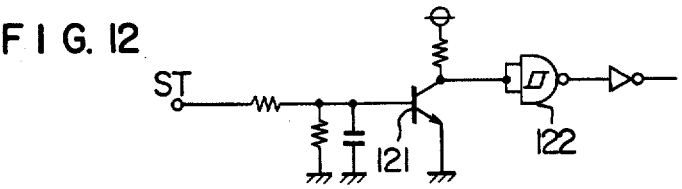
FIG. 12 is a diagram showing an electrical circuit for the waveform shaping circuit in FIG. 7.

The diagram of FIG. 12 shows a waveform shaping circuit 2c for processing the starter signal ST from the key switch and applying it to the digital input port 86. Numeral 121 designates a transistor for changing the level of the signal from the key switch and numeral 122 designates a Schmitt trigger circuit for waveform shaping a pulse.

Figure 13:
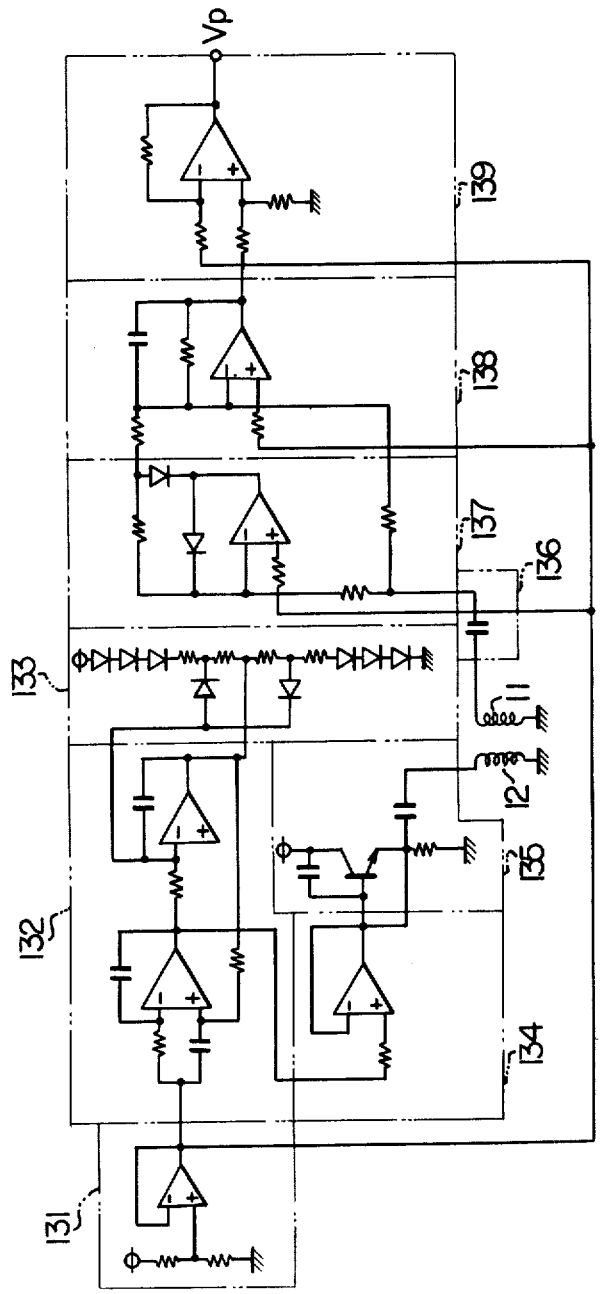
FIG. 13 shows an electrical circuit for the oscillation drive circuit and the detector circuit in FIG. 7.

A circuit associated with the actual position detector 7, namely, the detector circuit 2e and the oscillation drive circuit 2f are shown in FIG. 13. In the drawing, numerals 131 to 135 make up an oscillation drive circuit and numerals 136 to 139 a detector circuit. Numeral 131 designates a constant voltage circuit for supplying a fixed offset voltage to each amplification stage, and comprises a resistance dividing circuit and a buffer amplifier. Numerals 132 and 133 make up a quadrature oscillator circuit, numeral 134 an amplifier, and numeral 135 a current amplifier. Numeral 132 designates an oscillation section of the quadrature oscillation circuit, and numeral 133 designates an amplitude limiting circuit for limiting the amplitude of the oscillation waveform of the oscillator. The detector circuit includes a capacitor 136 for cutting the DC portion, a full-wave rectifier circuit 137, an integrator circuit 138 and a differential amplifier circuit 139. The output signal Vp of the differential amplifier 139 is applied as an actual position signal to the electromagnetic actuator servo circuit 2b.

Figure 14:
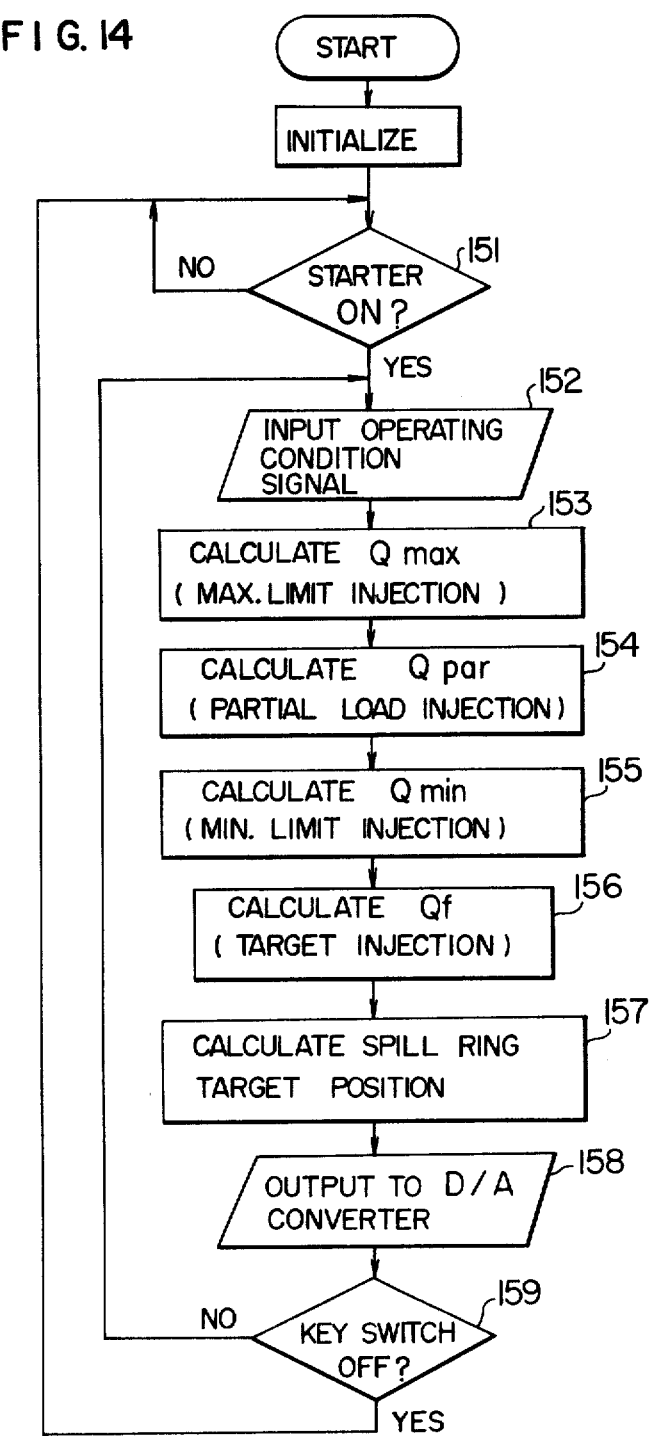
FIGS. 14, 15, 17 and 19 are flowcharts representing the sequence of processes in the microcomputer.
Figure 15:
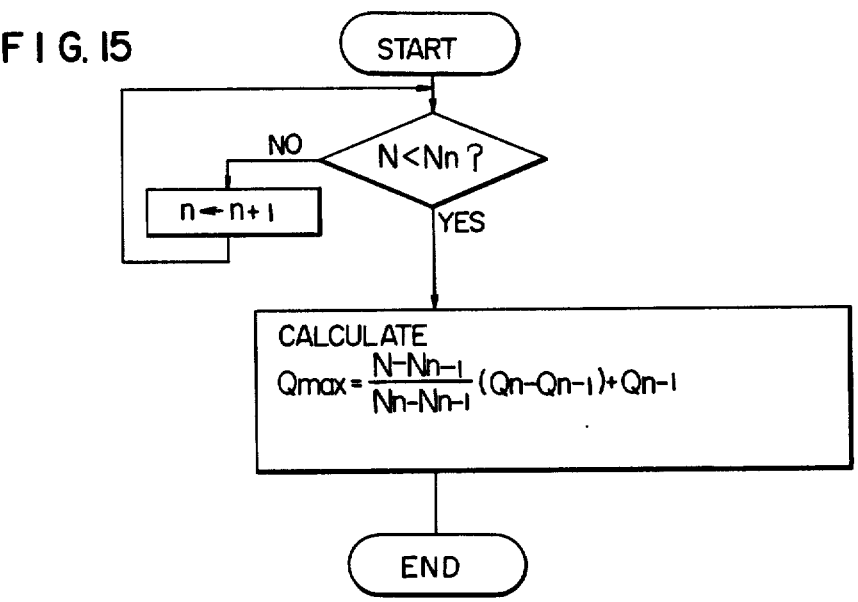
Figure 16:
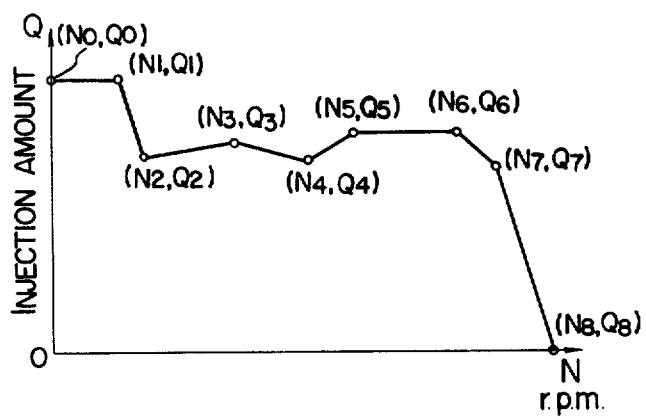
FIGS. 16, 18, 20, 21, 24 and 25 show characteristic diagrams for explaining the operation of the present invention.

A flowchart representing the sequence of processes in the microcomputer section 2a is shown in FIG. 14. Explanation will now be made about the processes of calculating the target position signal indicative of the target position of the spill ring 4 making up a fuel adjusting member with reference to this flowchart. Numeral 150 indicates a program initialize step, in which various preparations required for the processes are made. Thus the conditions for the input and output ports are set, and the contents of the variable storage area are reduced to zero. Numeral 151 designates a step for deciding whether or not the starter signal is turned on, and when the key switch of the automobile is closed at the starter-on position, the process is transferred to step 152. Numeral 152 designates a step for introducing the signal from the operating condition detector 1 into the microcomputer. In the description that follows, the engine rotational speed or r.p.m. and the amount of acceleration pedal operation will be referred to as N and PA respectively. Numeral 153 shows a step for calculating the maximum amount limit of injection Qmax, a detailed flowchart of which is shown in FIG. 15. A pattern of the maximum amount limit of injection is shown in FIG. 16. This pattern is defined by storing No, Qo, N1, Q1, .., Nn and Qn in that order in the read only memory 31. The value n is not fixed but variable and therefore any desired pattern of the maximum amount limit of fuel injection Qmax is realizable. By increasing this value, a detailed control is made possible and thus it is possible to produce the maximum output within the limit of smoke concentration. In this step 153, only the engine rotational speed N is used among the signals representing the operating conditions to calculate the maximum amount limit of fuel injection Qmax from the pattern of FIG. 16. As an example, in the case where the value takes a rotational speed between N3 and N4, the value Qmax may be calculated as $$Qmax = \frac{N - N_3}{N_4 - N_3} \times (Q_4 - Q_3) + Q_3$$

Figure 18:
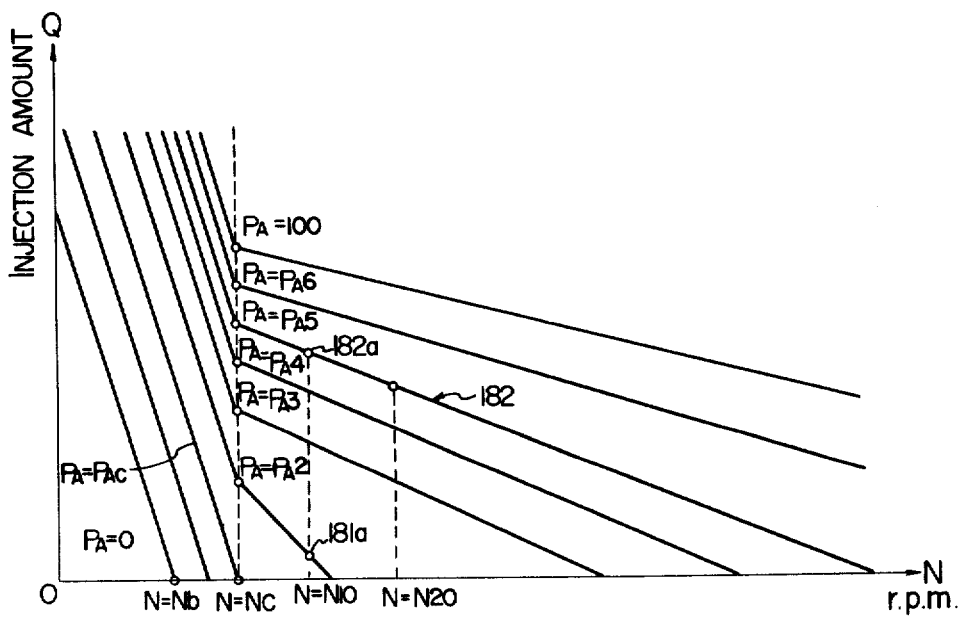
Figure 17:
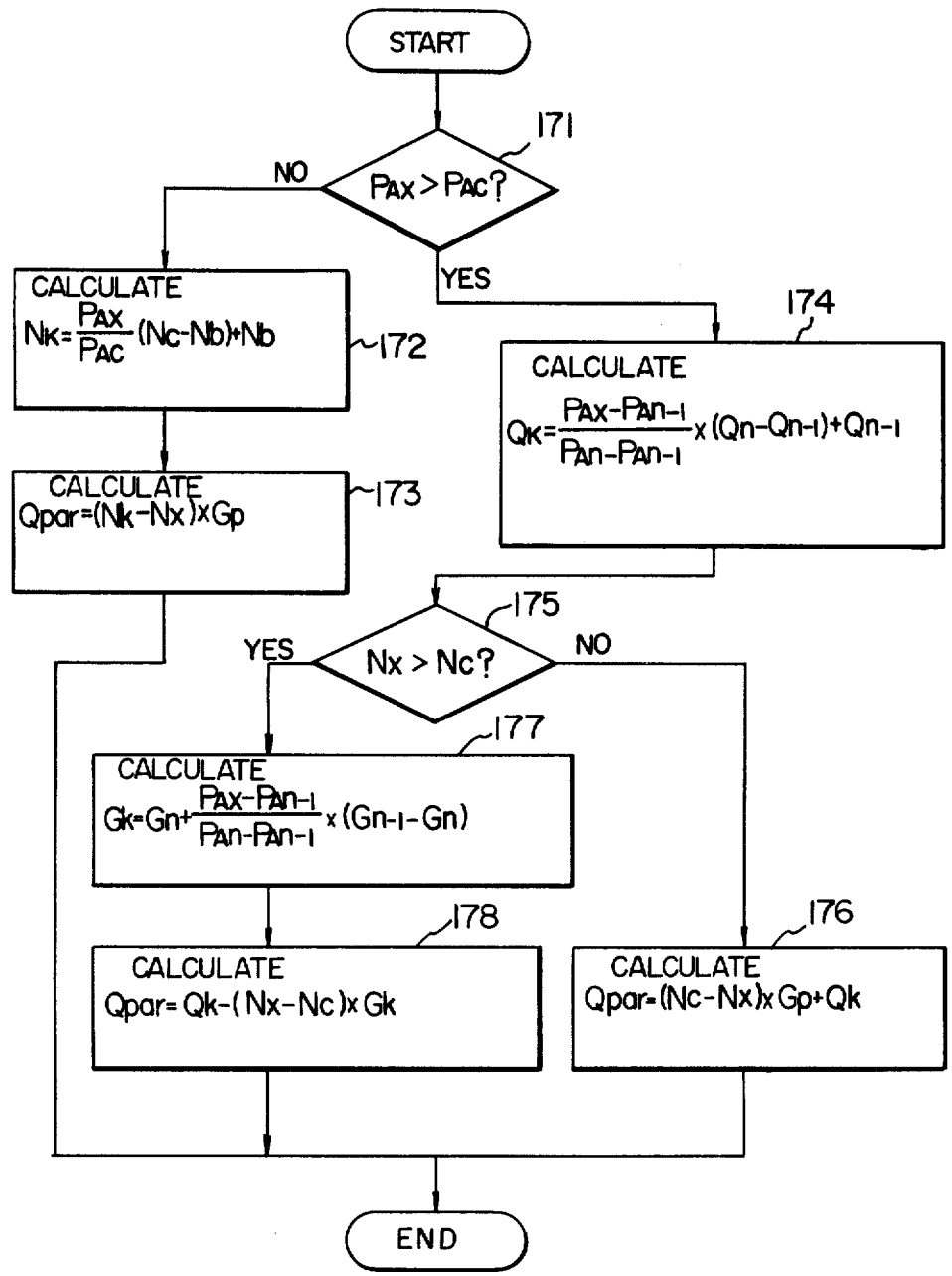

The step 154 is for calculating the amount of fuel injection under partial load by use of the engine rotational speed N and the acceleration pedal operating amount PA. A detailed flowchart of the step 154 is shown in FIG. 17, and the fuel injection amount pattern under partial load is shown in FIG. 18. When the acceleration pedal operating amount PA is between 0% and PAc%, the pattern gradient is fixed, and in accordance with the acceleration pedal operating amount, the pattern line moves between the point of N=Nb and the point of N=Nc. For the acceleration pedal operating amount PA higher than PAc%, the pattern line is determined by the dots defined on the line of N=Nc (the line shown by dots in FIG. 18). There are a given number of these dots as in the case of the corners of the polygonal pattern of maximum limit amount of injection. In the case where the engine rotational speed N is larger than Nc, the gradient of the pattern line changes with the acceleration pedal operating amount, so that the smaller the acceleration pedal operating amount, the steeper the gradient thereof. Further, the ratio of increase in the gradient of the decrease in the acceleration pedal operating amount is not necessarily linear, and by increasing the number of dots defined on the line of N=Nc, it is possible to obtain an approximately desired relation. These dots on the line of N=Nc, are defined as dots having three factors including the acceleration pedal operating amount PAi, the fuel injection amount Qi and the line gradient Gi. These dot information are stored in the read only memory 81 within the microcomputer 2a in the forms of PA1, Q1, G1; PA2, Q2, G2; . . . , PAn, Qn, Gn in that order.

Now, explanation will be made of the manner in which the injection amount under partial load Qpar is calculated for the acceleration pedal operating amount PAx and the engine rotational speed Nx with reference to FIG. 17. In the step 171, it is decided whether or not the acceleration pedal operating amount PAx is larger than PAc. If PAx is smaller than PAc, the calculation of the step 172 is made thereby to determine the crossing Nk on N axis by the formula $$Nk = \frac{PAx}{PAc} (Nc - Nb) + Nb.$$

At step 173, the injection amount under partial load Qpar is obtained from the engine rotational speed Nx by the formula Qpar=(Nk−Nx)×Gp, where Gp is the line gradient in the case where Nx is smaller than Nc. In the case where the acceleration pedal operating amount PAx is larger than PAc, the intercept value Qk on the line N=Nc is calculated by the step 174. If the value PAx is between PA3 and PA4, for instance, the intercept value Qk on the line N=Nc is given by the formula below.

$$Qk = Q_3 + \frac{PAx - PA_3}{(PA_4 - PA_3)} \times (Q_4 - Q_3)$$

By the step 175, the difference between Nx and Nc is taken. If Nx≦Nc, the value Qpar is calculated from Qpar=(Nc−Nx)×Gp+Qk at the step 176. When Nx is larger than Nc, on the other hand, the line gradient Gk is calculated from $$Gk = Gn + \frac{PA_x - PA_{n-1}}{PA_n - PA_{n-1}} \times (G_{n-1} - G_n)$$

at the step 177. Next, at the step 178, the injection amount under partial load Qpar is calculated from Qpar=Qk−(Nx−Nc)×Gk. These calculations are made thereby to determine the injection amount under partial load Qpar.

Figure 20:
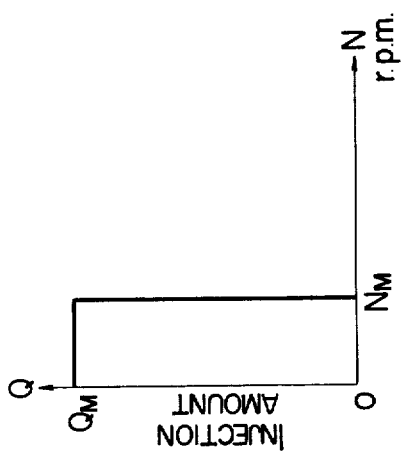
Figure 19:
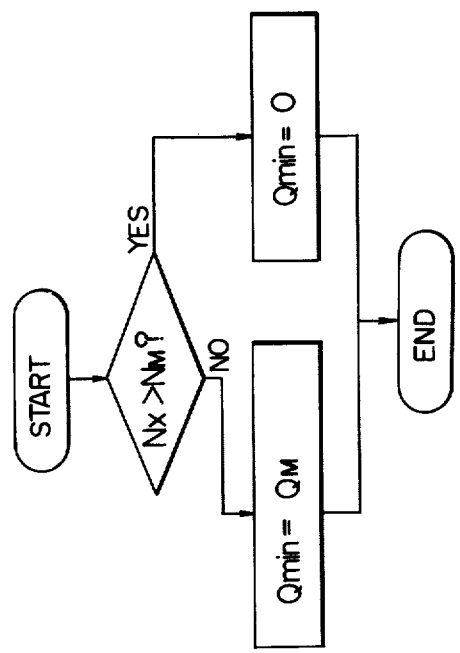

In FIG. 14, numeral 155 designates a step for calculating the minimum limit injection amount Qmin. A detailed flowchart of the step 155 is shown in FIG. 19, and a pattern of the minimum injection amount Qmin is shown in FIG. 20. In the case where the engine rotational speed Nx is larger than $N_M$, Qmin=O, while Nx is smaller than $N_M$, Qmin=$Q_M$.

The step 156 is for calculating the final target amount of fuel injection (a target value of fuel injected) from the above-described three injection amounts including Qmax, Qpar and Qmin. Specifically, the larger one of the two values including the minimum limit amount of injection Qmin and the injection amount under partial load Qpar is selected. Then the selected value is compared with the maximum limit amount of injection Qmax thereby to determine which is smaller, so that the smaller value is determined as a target injection amount Qf. This process is expressed as $$Qf = Min\ [Qmax,\ \{Max\ (Qmin,\ Qpar)\}]$$

Figure 22:
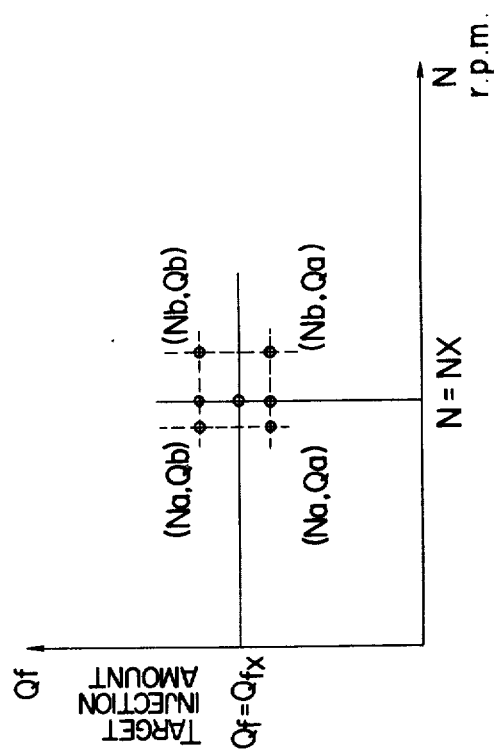
FIG. 22 illustrates a map for calculating the target position signal.
Figure 21:
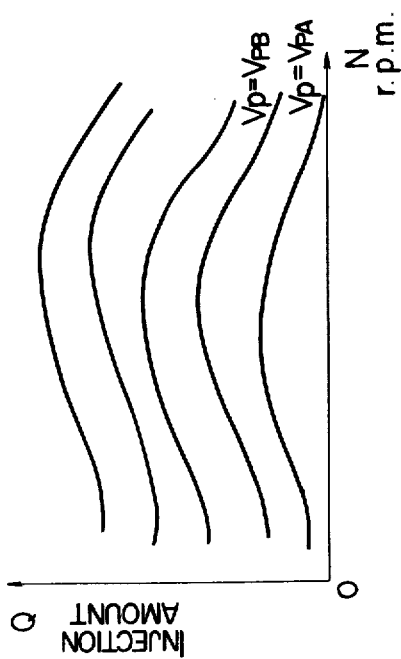

The step 157 is for calculating the target position of the spill ring 4 from the target injection amount Qf resulting from the calculations through the above-mentioned various steps. In the case of distribution type fuel injection pump, the amount of pump injection changes with the rotational speed of the injection pump for the same position of the spill ring 4, in the manner as shown in FIG. 21. In order to correct this characteristic of the injection pump and achieve the same injection amount and the target injection amount Qf for different rotational speeds of the injection pump, the target position of the spill ring 4 is calculated at the step 157. The value of the target position signal $V_{SN}$ representing the target position for the engine rotational speed N and the target injection amount Qf is stored in the read only memory 81 of the computer section 2a as a map. An example of the processes for determining the target position signal $V_{SN}$ from the value of this map will be described. Assume that the engine rotational speed is N=Nx and the target injection amount calculated at the step 156 is Qf=Qfx, and these values are in such a relation to each other that Na<Nx<Nb and Qa<Qfx<Qb. Also assume that the target position signal for the point (Na, Qa) is $V_{SN}=V_{SN1}$, the target position signal for the point (Nb, Qa) is $V_{SN}=V_{SN2}$ the target position signal for the point (Na, Qb) is $V_{SN}=V_{SN3}$, and the target position signal for the point (Nb, Qb) is $V_{SN}=V_{SN4}$. The process for determining the target position signal $V_{SNx}$ for the point (Nx, Qfx) under these conditions will be explained with reference to FIG. 22. First, the target position signal $V_{SNa}$ for the point (Nx, Qa) is determined by the equation below.

$$V_{SNa} = \frac{Nx - Na}{Nb - Na} \times (V_{SN2} - V_{SN1}) + V_{SN1}$$

The target position signal $V_{SNb}$ for the point (Nx, Qb) is determined from the equation below.

$$V_{SNb} = \frac{Nx - Na}{Nb - Na} \times (V_{SN4} - V_{SN3}) + V_{SN3}$$

Finally, the target position signal $V_{SN}$ for the point (Nx, Qfx) is determined from the equation below.

$$V_{SN} = \frac{Qfx - Qa}{Qb - Qa} \times (V_{SNb} - V_{SNa}) + V_{SNa}$$

The above-mentioned series of calculations are performed at the step 157.

The step 158 is for applying the results of calculations $V_{SN}$ at the steps 153 to 157 to a digital-analog converter which produces an analog target position signal Vs proportional to the target position signal $V_{SN}$. Numeral 159 designates a step for deciding whether or not the driver has turned off the key switch by determining whether the battery voltage is higher or lower than a predetermined level. This method is possible due to the fact that the battery voltage is applied to the microcomputer 2a through the key switch. If the step 159 decides that the key switch is turned off, transfer is made back to the step 151, and step 151 is executed until the driver turns the key switch to the position of starter on, followed by a ready state. If it is decided that the key switch is not turned off, transfer is made back to the step 152, where an operating condition signal is newly received followed by the calculation of the injection amount. The foregoing is the contents of the program executed by the microcomputer 2a.

The electromagnetic actuator servo circuit 2a is for driving the electromagnetic actuator 3 in a manner to correct the error of the target position against the actual position from the signal $V_p$ produced by the actual position detector 7 and the target position signal Vs representing the target position produced by the microcomputer section 2a.

Figure 23:
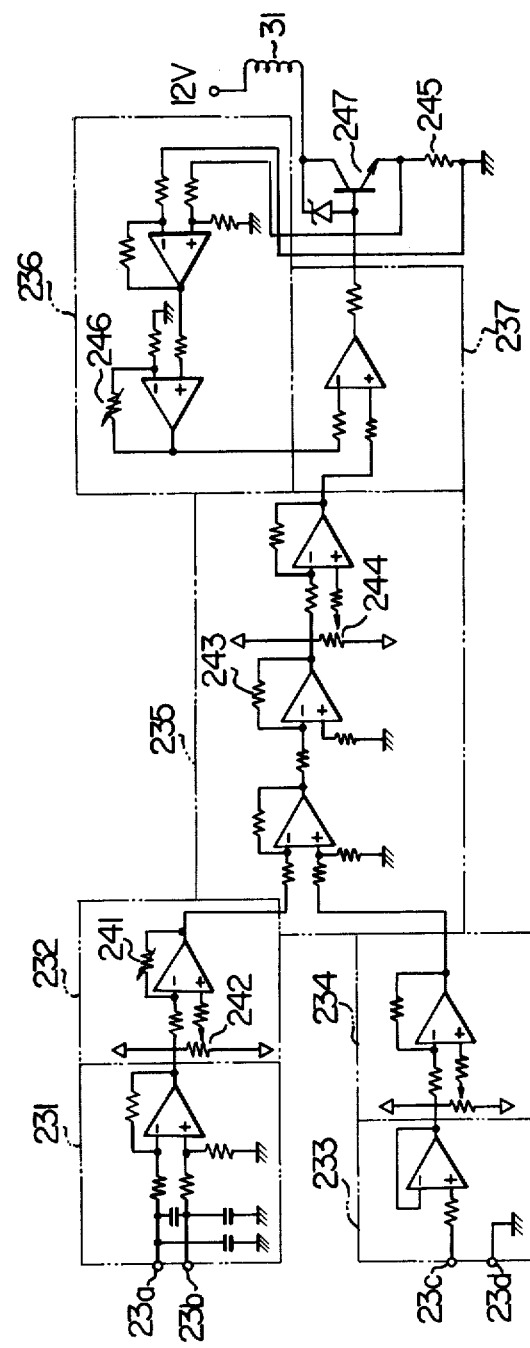
FIG. 23 shows an electrical circuit for the electromagnetic actuator servo circuit in FIG. 7.

A detailed diagram of the electrical circuit of electromagnetic actuator servo system is shown in FIG. 23. The target position signal Vs making up the output of the microcomputer section 2a is applied to the terminals 23a and 23b. The output voltage of the buffer amplifer stage 231 is —Vs. Numeral 232 shows an amplifer stage, the gain k2 of which is capable of being adjusted by the variable resistor 241, while the offset voltage Vb2 is adjustable by the variable resistor 242. The output voltage of the amplifier stage 232 is k2×Vs+Vb2. The block 233 makes up a voltage follower in which the actual position signal Vp is applied from the terminals 23c and 23d. The output voltage of the block 233 is the same as the input voltage and is Vp. The amplifier stage 234 applies the offset voltage of Vb3 to the input signal. The output voltage is —Vp+Vb3. The amplifier stage 232 is for amplifying the voltage difference between the output voltage of the amplifier stage 232 and the output voltage of the amplifier stage 234, and the gain thereof is variable by the variable resistor 243. Assuming that the output voltage of the amplifier stage 235 is V235 and the gain thereof is k4 and the offset voltage is Vb4, V235=k4×(k2·Vs+Vp+Vb2−Vb3)+Vb4. Numeral 245 designates a resistor for detecting the value of the current flowing in the coil 31 of the electromagnetic actuator 3, and a voltage proportional to the current is generated across the resistor 245. The amplifier stage 236 is for amplifying the voltage generated across the resistor 245 and has a gain determined by the resistor 246. The comparator stage 237 is for comparing the output voltages of the amplifier stage 235 and the amplifier stage 236 with each other, and thus controls the transistor 247. As a result, the current flowing in the coil 31 of the electromagnetic actuator is proportional to the voltage V235 on the average.

Figure 24:
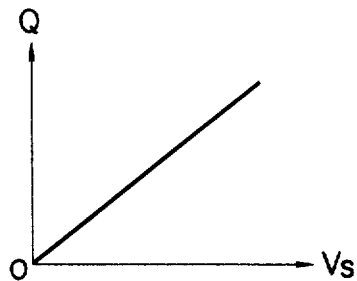
Figure 25:
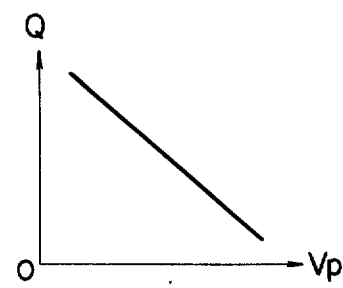

The relation between the injection amount Q and the target position signal Vs is shown in FIG. 24, the relation between the injection amount Q and the actual position signal Vp is shown in FIG. 25. In view of the relations shown by these diagrams, a negative feedback loop is formed for the injection amount. The relation between the actual position signal Vp and the injection amount Q as shown in FIG. 25 is established in order to prevent the engine from excessive rotation in the event that the sensor fails to produce an output signal by reason of wire breakage or the like. The current flowing in the coil 31 of the electromagnetic actuator 3 through the current detecting resistor 245 and the amplifier stage 236 is converted into a voltage and fed back for dual purposes of correcting the variation of the battery voltage applied directly to the coil 31 of the actuator 3 and correcting the change in the resistance value of the coil 31 caused by the change in thermal environment or self-heating.

Now, explanation will be made of the operation of the fuel injection pump governor comprised of the above-described component elements. Assume that the acceleration pedal operating amount is constant and the engine rotational speed is Ne (rpm). When the load on the engine changes and the rotational speed is reduced below Ne, the frequency of the waveform detected by the rotational speed detector 1b2 decreases, so that the number detected by the counter 854 in FIG. 9 increases. On the basis of this information, the central processing unit 80 of the microcomputer section 2a executes the steps 152 to 157 in FIG. 14. Under this condition, as explained with reference to the calculation of the step 154, the decrease in the engine rotational speed N causes an increase in the injection amount on the partial load injection amount pattern of FIG. 18. Thus the result of the calculation, namely, the target position signal $V_{SN}$ at the microcomputer section 2a increases. The signal $V_{SN}$ is converted into an analog target position signal Vs by the step 157, thus increasing the value Vs. The electromagnetic actuator servo circuit 26 is such that when the target position signal Vs increases, the output voltage of the amplifier stage 232 increases thereby to increase the output voltage of the amplifier stage 235. With the increase in this voltage, the output voltage of the comparator stage 237 provides a positive source voltage. Thus the transistor 247 conducts and current flows in the coil 31 of the electromagnetic actuator 3 thereby to generate a voltage across the resistor 245. This voltage is amplified by the amplifier stage 236 and applied to a terminal of the operational amplifier of the comparator stage 237. With the increase in the current flowing in the electromagnetic actuator 3, the moving core 33 of the actuator 3 moves in the direction of arrow a in FIG. 6. With the movement of the moving core 33 in the direction of arrow a, the spill ring 4 is moved in the direction of arrow b through a link mechanism adjacent thereof, with the result that the amount of fuel injected into the engine is increased, thus increasing the rotational speed of the engine. Subsequently, the component parts operate reversely to the above-mentioned operations so that the amount of fuel injection is reduced thereby to maintain the engine rotational speed constant.

In the embodiment under consideration, the dots on the line N=Nc of the partial load injection amount pattern in FIG. 18 are set in such a manner that when the acceleration pedal operating amount PA is small, the change of the injection amount Qf with the change in the acceleration pedal operating amount is comparatively large. Specifically, when the value PA increases from 10% to 20%, the value Qf increases by 40%. In this way, much fuel is injected for a small amount of the acceleration pedal operation, thus giving a satisfactory vehicle acceleration feeling to the driver. Assume that the driver is running the automobile at the acceleration pedal operating amount of PA 2% with the engine running at the speed of N10. If the acceleration pedal operating amount is increased to PA 5%, the output voltage of the acceleration pedal operating amount detector 1a increases thereby to increase the output voltage of the amplifier stage 112 in FIG. 11. The microcomputer section 2a detects the change in the acceleration pedal operating amount, which causes the partial load injection amount Qpar to move from point 181a to 182a in the calculation of the step 154 in FIG. 14. As a result, the target position signal Vs increases and the electromagnetic actuator is moved in the direction of arrow a through the electromagnetic actuator servo circuit, so that the spill ring 4 is moved in the direction of arrow b thereby to increase the fuel injection amount. With the increase in the fuel injection amount, the engine rotational speed increases, whereby the partial load injection amount Qpar calculated by the microcomputer 2a is decreased along the line 182 with the result that the rotational speed is settled at a new value of N20.

Figure 26:
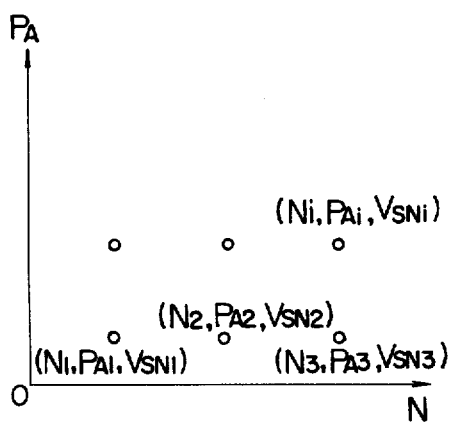
FIG. 26 illustrates a map for calculating the target position signal according to a second embodiment of the present invention.

A second embodiment of the invention will be described. In the aforementioned first embodiment, the microcomputer 2a calculates the target position signal in such a sequence that first the maximum limit amount of injection Qmax is calculated, followed by the calculation of the partial load injection amount Qpar, followed by the calculation of the minimum limit amount of injection Qmin followed by the calculation of the target injection amount Qf on the basis of the abovementioned three values. The value Qf and the engine rotational speed N are used to search the map of the target position signal $V_{SN}$ thereby to determine the target position signal. In the second embodiment, by contrast, a different sequence is taken. The map used for the second embodiment is shown in FIG. 26. In this map, the Y axis represents the acceleration pedal operating amount PA, the X axis represents the engine rotational speed N, and the Z axis represents the target position signal $V_{SN}$. When N=Ni and PA=PAi, for instance, the relation $V_{SN}=V_{SNi}$ is obtained. This map data are stored in the read only memory in the same manner as the map data of the target position signal $V_{SN}$ associated with the engine rotational speed N and the target injection amount Qf in the first embodiment. In this way, this map is searched on the basis of the acceleration pedal operating amount PA and the engine rotational speed N, and the 4-point interpolation is made as described in the first embodiment, thus determining the target position signal $V_{SN}$. The rest is the same as in the first embodiment.

Figure 27:
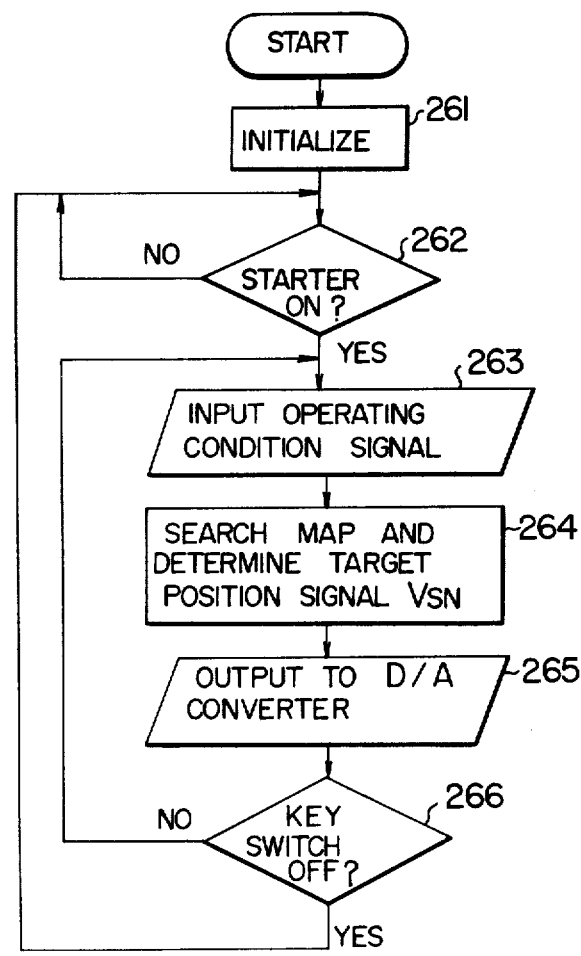
FIG. 27 is a flowchart showing the sequence of processes in the microcomputer according to the second embodiment.

A flowchart for calculating the target position signal $V_{SN}$ by the microcomputer 2a in the second embodiment is shown in FIG. 27. The step 261 is for clearing the various variables required for executing the program. At the step 262, it is decided whether the starter is turned on or off, and when the key switch of the automobile is turned to the starter-on position, the process is passed to the step 263. The step 263 is for receiving the signal from the operating condition detector 1. The step 264 is for determining the target position signal $V_{SN}$ directly from the acceleration pedal operating amount PA and the engine rotational speed N providing the operating conditions. At the step 265, the target position signal $V_{SN}$ obtained at the step 264 is applied to a digital-analog converter. The step 266 is for detecting whether or not the key switch is turned off by the driver. In the case where the key switch is turned off, the process is transferred to the step 262, while when the key switch is turned on, the process is passed to the step 263. The second embodiment is thus different from the first embodiment in that in the second embodiment the target position signal $V_{SN}$ is calculated directly from the engine operating conditions.

It will be understood from the foregoing description that according to the present invention a value corresponding to the target injection amount of the fuel injection pump is calculated by searching a predetermined map, and the actual injection amount is corrected to the target injection amount, so that the amount of fuel injection can be controlled with high accuracy, leading to a superior operability and a superior stability in idling state. Also, in view of the fact that a predetermined map is searched in accordance with the target value of fuel injection amount and the engine rotational speed thereby to calculate the target position of the fuel adjusting member, the great advantage is obtained that the difference in fuel injection amount for the same position of the fuel adjusting member due to different rotational speeds is corrected.

Further, according to the present invention, the relation between the rate of increase in the acceleration pedal operating amount and the rate of increase in the partial load injection amount is such that the partial load injection amount is increased to a larger degree for a small amount of acceleration pedal operation than for a great amount of acceleration pedal operation, and on the basis of this injection amount pattern, the partial load injection amount is calculated, thus resulting in the great advantage of a superior acceleration characteristic of the automobile.

We claim:

1. In a fuel injection pump having a spill ring used for the fuel system of a compressed ignition type internal combustion engine, an electrical fuel injection pump governor for optimally regulating the amount of fuel injected in nonlinear relation with the displacement of said spill ring in accordance with the engine running conditions, said governor comprising:

an electromagnetic actuator for driving said spill ring;

an actual position detector for electrically detecting the displaced position of said spill ring and generating an actual position signal;

an engine running condition detector for detecting the engine running condition to generate an electrical detection signal, said engine running condition detector including a rotational speed detector for generating a rotational speed indication signal by detection of the engine rotational speed;

target value calculating means including target injection amount calculator means for calculating the target value of injection amount corresponding to the detection signal from said running condition detector, memory map means storing data of a plurality of spill-ring target positions corresponding to two parameters of engine rotational speeds and target values of injection amount, and position calculating means capable of searching and reading out desired data of spill-ring target position from said memory map means in correspondence with the two parameters of an engine rotational speed and target value of injection amount wherein different desired data of spill-ring target position can be read out from said map means in order to follow variation in engine rotational speed even with respect to a same target value of injection amount; and drive means for comparing said target position indication signal with said actual position signal and driving said electromagnetic actuator in accordance with the error between said two signals.

2. An electrical fuel injection pump governor according to claim 1, wherein said engine running condition detector includes means for detecting the acceleration pedal operating amount and generating an acceleration pedal operating-amount indication signal, and said target injection amount calculating means includes means for calculating the maximum limit injection amount indication value with reference to said rotational speed indication signal as a basic control parameter, means for calculating a partial load injection amount indication value with reference to said rotational speed indication signal and said acceleration pedal operating amount indication signal as basic control parameters, and minimum value selector means for comparing said maximum limit injection amount indication value with said partial load injection amount indication value and selecting a smaller injection amount indication value of the two values as the target value of said injection amount.

3. An electrical fuel injection pump governor according to claim 2, wherein said partial load injection amount indication value calculating means including map means for storing acceleration pedal operating amount indication signals, said rotational speed indication signals and said partial load injection amount indication values in such an injection amount pattern that said partial load injection amount indication value changes at a greater rate with the change of engine rotational speed with the smaller said acceleration pedal operation amount in response to said acceleration pedal operation amount indication signal and said rotational speed indication signal; and means for reading out said stored values and calculating a desired partial load injection amount.

4. An electrical fuel injection pump governor according to claim 3, wherein said partial load injection amount calculating means calculates said partial load injection amount on the basis of said injection amount pattern in which said partial load injection amount increases at a greater rate for a small amount of the acceleration pedal operation than for a large amount of acceleration pedal operation.

5. An electrical fuel injection pump governor according to claim 1, wherein said map means includes a read only memory and said calculating means includes a microcomputer.

6. An electrical fuel injection pump governor according to claim 1, wherein said drive means includes means for performing differential amplification of said target position indication signal and said actual position signal from said actual position detector, means for feeding back a voltage proportional to said actuator coil current, and means for comparing said feedback voltage and said differential amplification voltage and rendering said actuator coil current be substantially proportional to said differential amplification voltage.

7. An electrical fuel injection pump governor according to claim 1, wherein said electromagnetic actuator includes a fixed core having opposed side portions and a central protrusion positioned between said side portions, an exciting coil wound on the outside of said side portions, a moving core having a recess opposed to said protrusion and bias means for generating a bias opposing the movement of said moving core, said protrusion and said recess being engaged and disengaged in response to the energization and deenergization of said coil.

* * * * *